US009099900B2

(12) United States Patent
Glubrecht

(10) Patent No.: US 9,099,900 B2
(45) Date of Patent: Aug. 4, 2015

(54) ELECTRIC MACHINE MODULE COOLING SYSTEM AND METHOD

(75) Inventor: Dale Glubrecht, Noblesville, IN (US)

(73) Assignee: Remy Technologies, LLC, Pendleton, IN (US)

( * ) Notice: Subject to any disclaimer, the term of this patent is extended or adjusted under 35 U.S.C. 154(b) by 771 days.

(21) Appl. No.: 13/312,133

(22) Filed: Dec. 6, 2011

(65) Prior Publication Data

US 2013/0140924 A1 Jun. 6, 2013

(51) Int. Cl.
*H02K 9/00* (2006.01)
*H02K 1/20* (2006.01)
*H02K 3/24* (2006.01)
*H02K 5/20* (2006.01)
*H02K 3/34* (2006.01)
*H02K 9/19* (2006.01)

(52) U.S. Cl.
CPC .. *H02K 1/20* (2013.01); *H02K 3/24* (2013.01); *H02K 5/20* (2013.01); *H02K 3/345* (2013.01); *H02K 9/19* (2013.01); *Y10T 29/49009* (2015.01)

(58) Field of Classification Search
USPC .......................................... 310/52, 54, 57, 59
IPC .................... H02K 9/00,9/005, 9/08, 9/10, 9/12
See application file for complete search history.

(56) References Cited

U.S. PATENT DOCUMENTS

| | | | | |
|---|---|---|---|---|
| 1,448,700 A | * | 3/1923 | Seidner | 310/54 |
| 2,080,678 A | | 5/1937 | Van Horn et al. | |
| 2,264,616 A | | 12/1941 | Buckbee | |
| 2,722,616 A | * | 11/1955 | Moses | 310/54 |
| 2,873,393 A | * | 2/1959 | Baudry | 310/55 |
| 3,447,002 A | | 5/1969 | Ronnevig | |
| 3,525,001 A | | 8/1970 | Erickson | |
| 3,748,507 A | | 7/1973 | Sieber | |
| 4,038,570 A | | 7/1977 | Durley, III | |
| 4,182,966 A | * | 1/1980 | Mishra et al. | 310/59 |
| 4,306,165 A | * | 12/1981 | Kitabayashi et al. | 310/59 |
| 5,081,382 A | | 1/1992 | Collings et al. | |

(Continued)

FOREIGN PATENT DOCUMENTS

| | | |
|---|---|---|
| JP | 05-103445 A | 4/1993 |
| JP | 05-292704 A | 11/1993 |

(Continued)

OTHER PUBLICATIONS

WIPO Search Report and Written Opinion dated Oct. 29, 2012 for corresponding Application No. PCT/US2012/033915; 8 sheets.

(Continued)

*Primary Examiner* — Dang Le
(74) *Attorney, Agent, or Firm* — Greenberg Traurig, LLP

(57) ABSTRACT

Embodiments of the invention provide an electric machine module. The module can include a housing, which can define a machine cavity. In some embodiments, a coolant jacket can be at least partially positioned within the housing. In some embodiments, a plurality of coolant apertures can be disposed through at least a portion of the housing. A stator assembly can be at least partially disposed within the housing and can include a plurality of coolant channels being in fluid communication with the machine cavity. Each of the coolant channels includes at least one radial subunit and at least one axial subunit. The radial subunits are fluidly coupled to some of the coolant apertures so that the coolant jacket is in fluid communication with the machine cavity via the coolant channels.

15 Claims, 6 Drawing Sheets

(56) References Cited

U.S. PATENT DOCUMENTS

| | | | |
|---|---|---|---|
| 5,180,004 | A | 1/1993 | Nguyen |
| 5,207,121 | A | 5/1993 | Bien |
| 5,293,089 | A | 3/1994 | Frister |
| 5,372,213 | A | 12/1994 | Hasebe et al. |
| 5,519,269 | A | 5/1996 | Lindberg |
| 5,616,973 | A | 4/1997 | Khazanov |
| 5,859,482 | A | 1/1999 | Crowell et al. |
| 5,923,108 | A | 7/1999 | Matake et al. |
| 5,937,817 | A | 8/1999 | Schanz et al. |
| 5,965,965 | A | 10/1999 | Umeda et al. |
| 6,011,332 | A | 1/2000 | Umeda et al. |
| 6,069,424 | A | 5/2000 | Colello et al. |
| 6,075,304 | A | 6/2000 | Nakatsuka |
| 6,087,746 | A | 7/2000 | Couvert |
| 6,095,754 | A | 8/2000 | Ono |
| 6,097,130 | A | 8/2000 | Umeda et al. |
| 6,114,784 | A | 9/2000 | Nakano |
| 6,147,430 | A | 11/2000 | Kusase et al. |
| 6,147,432 | A | 11/2000 | Kusase et al. |
| 6,173,758 | B1 | 1/2001 | Ward et al. |
| 6,181,043 | B1 | 1/2001 | Kusase et al. |
| 6,201,321 | B1 | 3/2001 | Mosciatti et al. |
| 6,208,060 | B1 | 3/2001 | Kusase et al. |
| 6,232,687 | B1 | 5/2001 | Hollenbeck et al. |
| 6,242,836 | B1 | 6/2001 | Ishida et al. |
| 6,291,918 | B1 | 9/2001 | Umeda et al. |
| 6,300,693 | B1 | 10/2001 | Poag et al. |
| 6,313,559 | B1 | 11/2001 | Kusase et al. |
| 6,333,573 | B1 | 12/2001 | Nakamura |
| 6,335,583 | B1 | 1/2002 | Kusase et al. |
| 6,346,758 | B1 | 2/2002 | Nakamura |
| 6,359,232 | B1 | 3/2002 | Markovitz et al. |
| 6,404,628 | B1 | 6/2002 | Nagashima et al. |
| 6,417,592 | B2 | 7/2002 | Nakamura et al. |
| 6,459,177 | B1 | 10/2002 | Nakamura et al. |
| 6,509,665 | B1 | 1/2003 | Nishiyama et al. |
| 6,515,392 | B2 | 2/2003 | Ooiwa |
| 6,522,043 | B2 | 2/2003 | Measegi |
| 6,559,572 | B2 | 5/2003 | Nakamura |
| 6,579,202 | B2 | 6/2003 | El-Antably et al. |
| 6,770,999 | B2 | 8/2004 | Sakurai |
| 6,897,594 | B2 | 5/2005 | Ichikawa et al. |
| 6,903,471 | B2 | 6/2005 | Arimitsu et al. |
| 6,998,749 | B2 | 2/2006 | Wada et al. |
| 7,002,267 | B2 | 2/2006 | Raszkowski et al. |
| 7,026,733 | B2 | 4/2006 | Bitsche et al. |
| 7,239,055 | B2 | 7/2007 | Burgman et al. |
| 7,276,006 | B2 | 10/2007 | Reed et al. |
| 7,284,313 | B2 | 10/2007 | Raszkowski et al. |
| 7,339,300 | B2 | 3/2008 | Burgman et al. |
| 7,352,091 | B2 | 4/2008 | Bradfield |
| 7,402,923 | B2 | 7/2008 | Klemen et al. |
| 7,417,344 | B2 | 8/2008 | Bradfield |
| 7,508,100 | B2 | 3/2009 | Foster |
| 7,538,457 | B2 | 5/2009 | Holmes et al. |
| 7,545,060 | B2 | 6/2009 | Ward |
| 7,592,045 | B2 | 9/2009 | Smith et al. |
| 7,615,903 | B2 | 11/2009 | Holmes et al. |
| 7,615,951 | B2 | 11/2009 | Son et al. |
| 7,667,359 | B2 | 2/2010 | Lee et al. |
| 7,939,975 | B2 | 5/2011 | Saga et al. |
| 8,067,865 | B2 | 11/2011 | Savant |
| 8,068,327 | B2 | 11/2011 | Seifert et al. |
| 2003/0222519 | A1 | 12/2003 | Bostwick |
| 2004/0036367 | A1 | 2/2004 | Denton et al. |
| 2004/0189110 | A1 | 9/2004 | Ide |
| 2004/0195929 | A1 | 10/2004 | Oshidari |
| 2005/0023266 | A1 | 2/2005 | Ueno et al. |
| 2005/0023909 | A1 | 2/2005 | Cromas |
| 2005/0194551 | A1 | 9/2005 | Klaussner et al. |
| 2005/0274450 | A1 | 12/2005 | Smith et al. |
| 2005/0285456 | A1 | 12/2005 | Amagi et al. |
| 2007/0024130 | A1 | 2/2007 | Schmidt |
| 2007/0052313 | A1 | 3/2007 | Takahashi |
| 2007/0063607 | A1 | 3/2007 | Hattori |
| 2007/0145836 | A1 | 6/2007 | Bostwick |
| 2007/0149073 | A1 | 6/2007 | Klaussner et al. |
| 2007/0216236 | A1 | 9/2007 | Ward |
| 2008/0223557 | A1 | 9/2008 | Fulton et al. |
| 2009/0058204 | A1 | 3/2009 | Sirois |
| 2009/0121562 | A1 | 5/2009 | Yim |
| 2009/0174278 | A1 | 7/2009 | Sheaffer et al. |
| 2009/0206687 | A1 | 8/2009 | Woody et al. |
| 2009/0267426 | A1 | 10/2009 | Graner et al. |
| 2010/0026111 | A1 | 2/2010 | Monzel |
| 2010/0102649 | A1 | 4/2010 | Cherney et al. |
| 2010/0109454 | A1 | 5/2010 | Vadillo et al. |
| 2010/0176668 | A1 | 7/2010 | Murakami et al. |
| 2011/0050141 | A1 | 3/2011 | Yeh et al. |
| 2011/0101700 | A1 | 5/2011 | Stiesdal |
| 2011/0109095 | A1 | 5/2011 | Stiesdal |
| 2011/0285222 | A1 | 11/2011 | Chamberlin et al. |

FOREIGN PATENT DOCUMENTS

| | | | |
|---|---|---|---|
| JP | 06-036364 | U | 5/1994 |
| JP | 06-311691 | A | 11/1994 |
| JP | 07-264810 | A | 10/1995 |
| JP | 08-019218 | A | 1/1996 |
| JP | 09-046973 | A | 2/1997 |
| JP | 09-154257 | A | 6/1997 |
| JP | 10-234157 | A | 9/1998 |
| JP | 11-132867 | A | 5/1999 |
| JP | 11-206063 | A | 7/1999 |
| JP | 2000-152563 | A | 5/2000 |
| JP | 2000-324757 | A | 11/2000 |
| JP | 2000-333409 | A | 11/2000 |
| JP | 2001095205 | | 4/2001 |
| JP | 2001-333559 | A | 11/2001 |
| JP | 2002-095217 | A | 3/2002 |
| JP | 2002-119019 | A | 4/2002 |
| JP | 2003-250247 | A | 9/2003 |
| JP | 2003-299317 | A | 10/2003 |
| JP | 2003-324901 | A | 11/2003 |
| JP | 2004-215353 | A | 7/2004 |
| JP | 2004-236376 | A | 8/2004 |
| JP | 2004-248402 | A | 9/2004 |
| JP | 2004-297924 | A | 10/2004 |
| JP | 2004-312886 | A | 11/2004 |
| JP | 2004-357472 | A | 12/2004 |
| JP | 2005-012989 | A | 1/2005 |
| JP | 2005-057957 | A | 3/2005 |
| JP | 2005-168265 | A | 6/2005 |
| JP | 2006-060914 | A | 3/2006 |
| JP | 2000-152561 | A | 9/2006 |
| JP | 2006-297541 | A | 11/2006 |
| JP | 2006-528879 | A | 12/2006 |
| JP | 2007-282341 | A | 10/2007 |
| JP | 2008-021950 | A | 2/2008 |
| JP | 2008-206213 | A | 9/2008 |
| JP | 2008-219960 | A | 9/2008 |
| JP | 4187606 | B2 | 11/2008 |
| JP | 2008-544733 | A | 12/2008 |
| JP | 2009-247084 | A | 10/2009 |
| JP | 2009-247085 | A | 10/2009 |
| JP | 2009-254205 | A | 10/2009 |
| JP | 2010-028908 | A | 2/2010 |
| JP | 2010-028958 | A | 2/2010 |
| JP | 2010-035265 | A | 2/2010 |
| JP | 2010-063253 | A | 3/2010 |
| JP | 2010-121701 | A | 6/2010 |
| JP | 2011188686 | A | 9/2011 |
| KR | 10-1997-0055103 | A | 7/1997 |
| KR | 10-2000-0013908 | A | 3/2000 |
| KR | 20050064841 | A | 6/2005 |
| KR | 10-2006-0102496 | A | 9/2006 |
| KR | 10-2007-0027809 | A | 3/2007 |
| KR | 10-2009-0048028 | A | 5/2009 |

OTHER PUBLICATIONS

WIPO Search Report and Written Opinion dated Nov. 14, 2012 for corresponding Application No. PCT/US2012/040794; 8 sheets.
International Search Report, Received Jul. 31, 2012.

(56) References Cited

OTHER PUBLICATIONS

International Search Report, Received Jan. 9, 2012.
International Search Report, Received Feb. 16, 2012.
International Search Report, Received Dec. 22, 2011.
International Search Report, Received Dec. 5, 2011.
International Search Report, Received Dec. 27, 2011.
International Search Report completed Apr. 19, 2012.
International Search Report completed Apr. 9, 2012.
International Search Report completed Apr. 20, 2012.
International Search Report completed Mar. 8, 2012.
International Search Report completed Apr. 24, 2012.
KIPO Search Report and Written Opinon dated Mar. 27, 2013 for corresponding application No. PCT/US2012/067790.

* cited by examiner

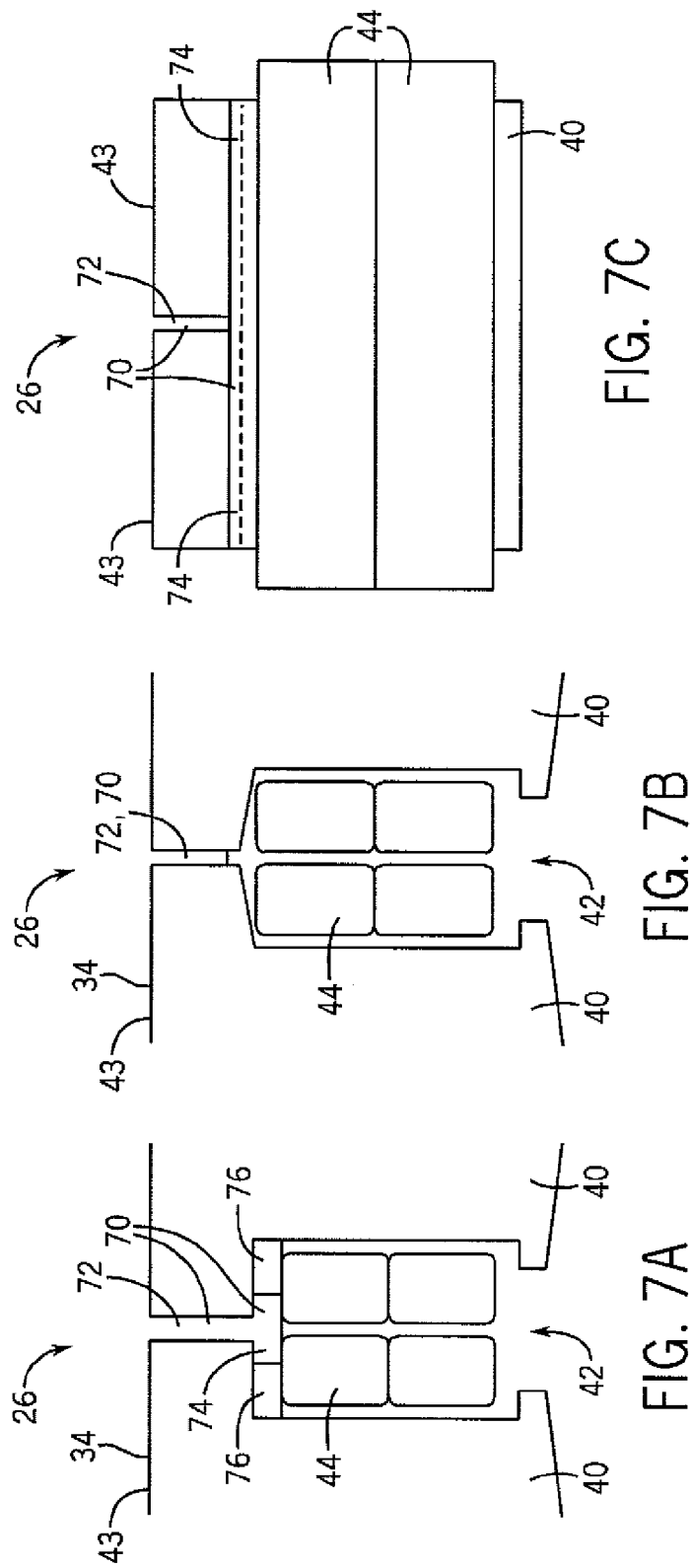

US 9,099,900 B2

ELECTRIC MACHINE MODULE COOLING SYSTEM AND METHOD

BACKGROUND

Electric machines, often contained within a machine cavity of a housing, generally include a stator assembly and a rotor assembly. For some electric machines, the stator assembly can be secured to the housing using different coupling techniques to generally secure the electric machine within the housing. During operation of some electric machines, heat energy can be generated by both the stator assembly and the rotor assembly, as well as some other components of the electric machine. The increase in heat energy produced by some elements of the electric machine can lead to inefficient machine operations or limitations in output.

SUMMARY

Some embodiments of the invention provide an electric machine module. The module can include a housing, which can define a machine cavity. In some embodiments, a coolant jacket can be at least partially positioned within the housing. In some embodiments, a plurality of coolant apertures can be disposed through at least a portion of the housing to fluidly couple the coolant jacket and the machine cavity. In some embodiments, a stator assembly can be at least partially disposed within the housing and can include a plurality of coolant channels. In some embodiments, the coolant channels can be in fluid communication with the machine cavity. In some embodiments, at least a portion of the coolant channels can comprise at least one radial subunit and at least one axial subunit. In some embodiments, some of the radial subunits can be fluidly coupled to at least a portion of the coolant apertures so that at least a portion of the coolant channels are in fluid communication with the coolant jacket and the machine cavity.

Some embodiments of the invention provide an electric machine module. The module can include a housing, which can define a machine cavity. In some embodiments, a coolant jacket can be at least partially positioned within the housing. In some embodiments, the housing can comprise a plurality of coolant apertures in fluid communication with the coolant jacket. In some embodiments, a stator assembly can be positioned within the machine cavity and at least partially enclosed by the housing so that the coolant jacket can substantially circumscribe at least a portion of the stator assembly. In some embodiments, the stator assembly can include a plurality of slots, an outer diameter, a first axial end, a second axial end, and stator end turns. In some embodiments, a plurality of coolant channels can be disposed through a portion of the stator assembly and each of the coolant channels can include an axial subunit that can extend from the first axial end of the stator assembly to the second axial end of the stator assembly. In some embodiments, the coolant channels can include a radial subunit extending from the outer diameter to the axial subunit. In some embodiments, the radial subunits can be in fluid communication with the coolant jacket via at least some of the coolant apertures.

DESCRIPTION OF THE DRAWINGS

FIG. 7A is cross-sectional view of a portion of a stator assembly according to one embodiment of the invention.

FIG. 7B is cross-sectional view of a portion of a stator assembly according to one embodiment of the invention.

FIG. 7C is cross-sectional view of a portion of a stator assembly according to one embodiment of the invention.

DETAILED DESCRIPTION

Figure 1:
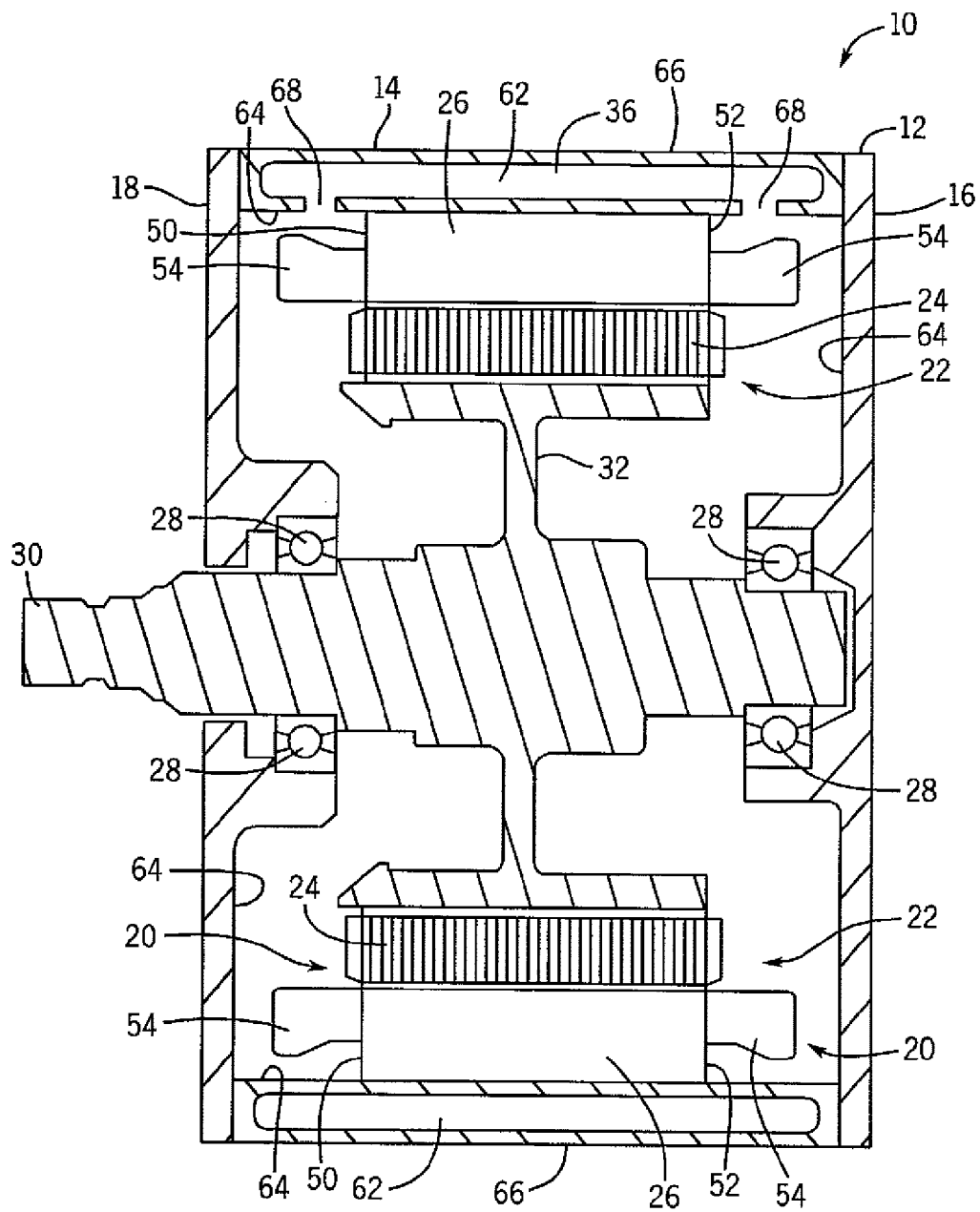
FIG. 1 is a cross-sectional view of an electric machine module according to one embodiment of the invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives that fall within the scope of embodiments of the invention.

Figure 2:
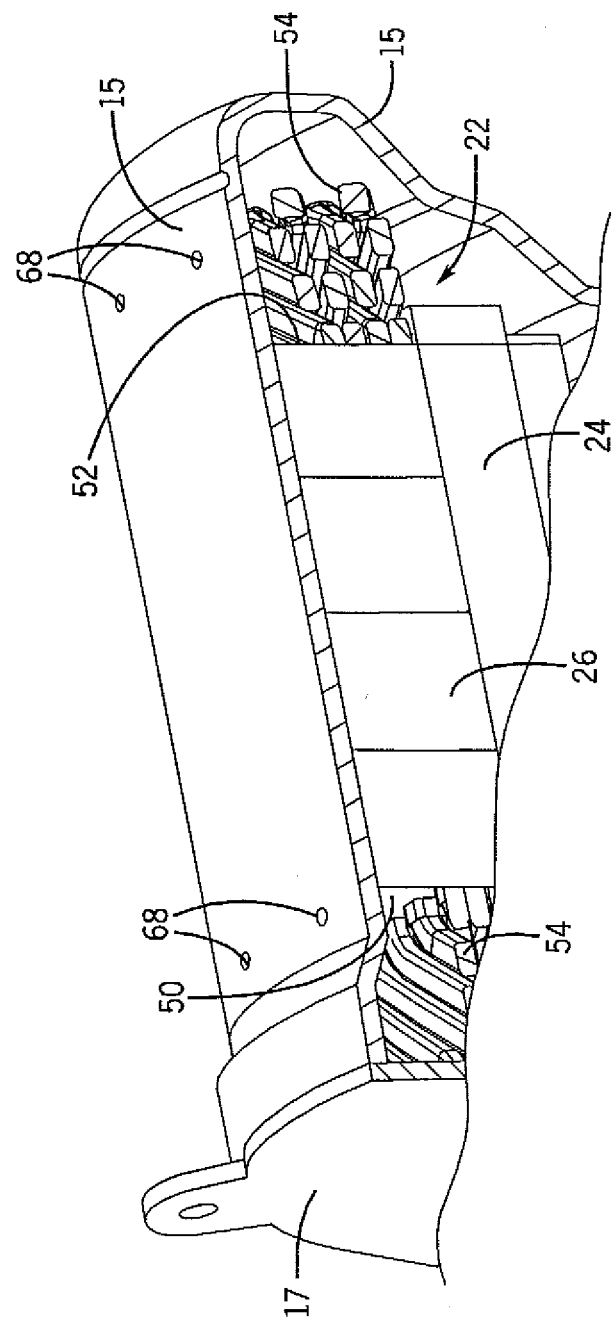
FIG. 2 is a partial cross-sectional view of an electric machine module according to one embodiment of the invention.

FIGS. 1 and 2 illustrate an electric machine module 10 according to one embodiment of the invention. The module 10 can include a housing 12 comprising a sleeve member 14, a first end cap 16, and a second end cap 18. An electric machine 20 can be housed within a machine cavity 22 at least partially defined by the sleeve member 14 and the end caps 16, 18. For example, the sleeve member 14 and the end caps 16, 18 can be coupled via conventional fasteners (not shown), or another suitable coupling method, to enclose at least a portion of the electric machine 20 within the machine cavity 22. In some embodiments, the housing 12 can comprise a substantially cylindrical canister 16 coupled to an end cap 17, as shown in FIG. 2. Further, in some embodiments, the housing 12, including the sleeve member 14 and the end caps 16, 18, can comprise materials that can generally include thermally conductive properties, such as, but not limited to aluminum or other metals and materials capable of generally withstanding operating temperatures of the electric machine. In some embodiments, the housing 12 can be fabricated using different methods including casting, molding, extruding, and other similar manufacturing methods.

The electric machine 20 can include a rotor assembly 24, a stator assembly 26, and bearings 28, and can be disposed about a shaft 30. As shown in FIG. 1, the stator assembly 26 can substantially circumscribe at least a portion of the rotor assembly 24. In some embodiments, the rotor assembly 24 can also include a rotor hub 32 or can have a "hub-less" design (not shown).

In some embodiments, the electric machine 20 can be operatively coupled to the housing 12. For example, the electric machine 20 can be fit within the housing 12. In some embodiments, the electric machine 20 can be fit within the housing 12 using an interference fit, a shrink fit, or other similar friction-based fits that can at least partially operatively couple the machine 20 and the housing 12. For example, in some embodiments, the stator assembly 26 can be shrunk fit into the module housing 12. Further, in some embodiments, the fit can at least partially secure the stator assembly 26, and as a result, the electric machine 20, in axial, radial and circumferential directions. In some embodiments, during operation of the electric machine 20 the fit between the stator assembly 26 and the housing 12 can at least partially serve to transfer torque from the stator assembly 26 to the housing 12. In some embodiments, the fit can result in a generally greater amount of torque retained by the module 10.

The electric machine 20 can be, without limitation, an electric motor, such as a hybrid electric motor, an electric generator, or a vehicle alternator. In one embodiment, the electric machine 20 can be a High Voltage Hairpin (HVH) electric motor, an interior permanent magnet electric motor, or an induction motor for hybrid vehicle applications.

Figure 3:
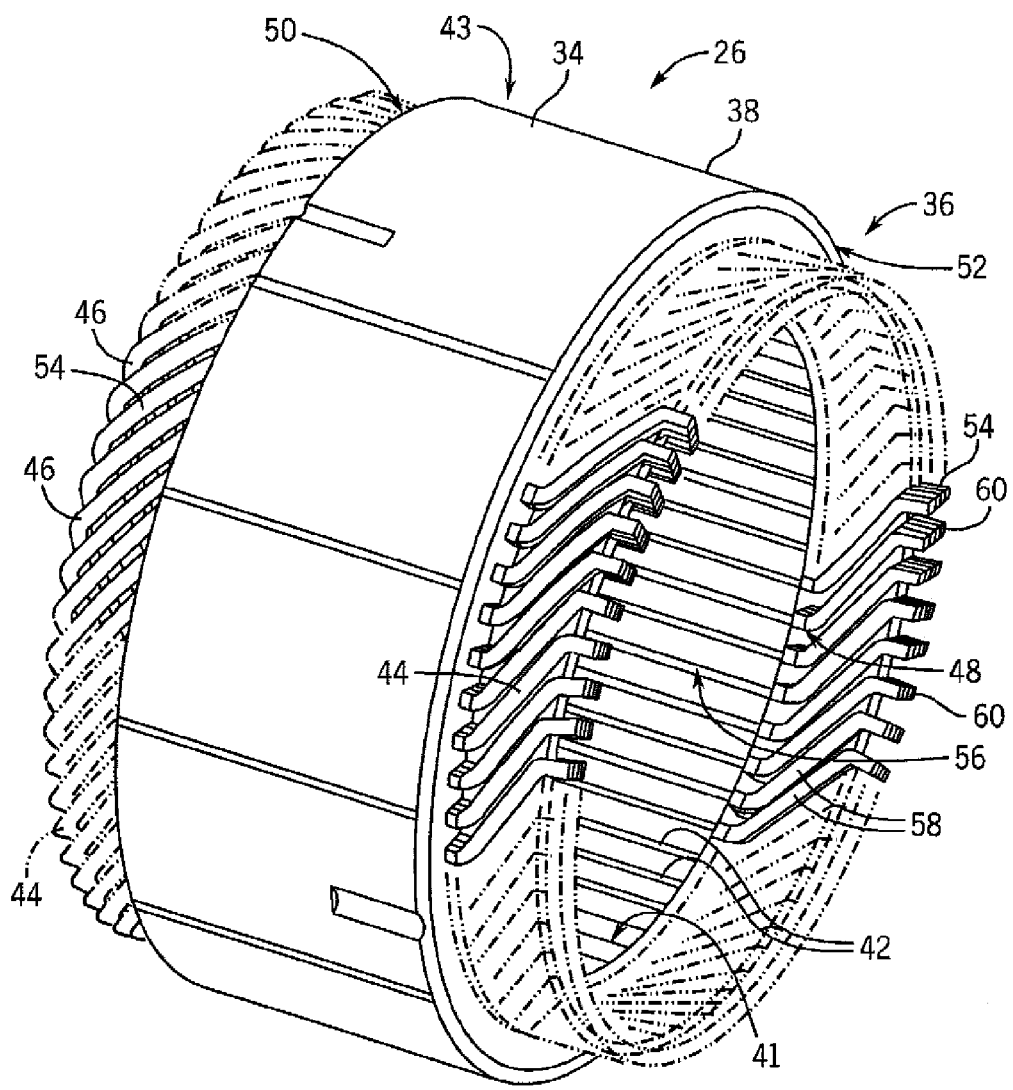
FIG. 3 is a perspective view of a stator assembly according to one embodiment of the invention.
Figure 4:
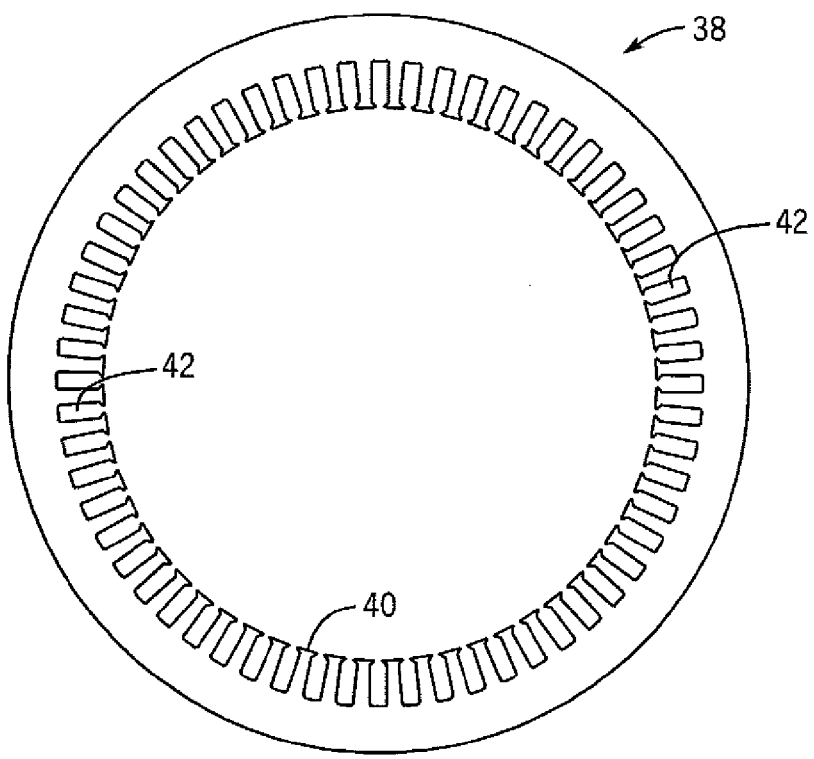
FIG. 4 is front view of a stator lamination according to one embodiment of the invention.

As shown in FIG. 3, in some embodiments, the stator assembly 26 can comprise a stator core 34 and a stator winding 36 at least partially disposed within a portion of the stator core 34. For example, in some embodiments, the stator core 34 can comprise a plurality of laminations 38. Referring to FIG. 4, in some embodiments, the laminations 38 can comprise a plurality of substantially radially-oriented teeth 40. In some embodiments, as shown in FIG. 3, when at least a portion of the plurality of laminations 38 are substantially assembled, the teeth 40 can substantially align to define a plurality of slots 42 that are configured and arranged to support at least a portion of the stator winding 36. As shown in FIG. 4, in some embodiments, the laminations 38 can include sixty teeth 40, and, as a result, the stator core 28 can include sixty slots 42. In other embodiments, the laminations 38 can include more or fewer teeth 40, and, accordingly, the stator core 34 can include more or fewer slots 42. Moreover, in some embodiments, the stator core 34 can comprise an inner perimeter 41 and an outer perimeter 43. For example, in some embodiments, the stator core 34 can comprise a substantially cylindrical configuration so that the inner and outer perimeters 41, 43 can comprise inner and outer diameters, respectively. However, in other embodiments, the stator core 34 can comprise other configurations (e.g., square, rectangular, elliptical, regular or irregular polygonal, etc.), and, as a result, the inner and outer perimeters 41, 43 can comprise other dimensions.

Figure 5:
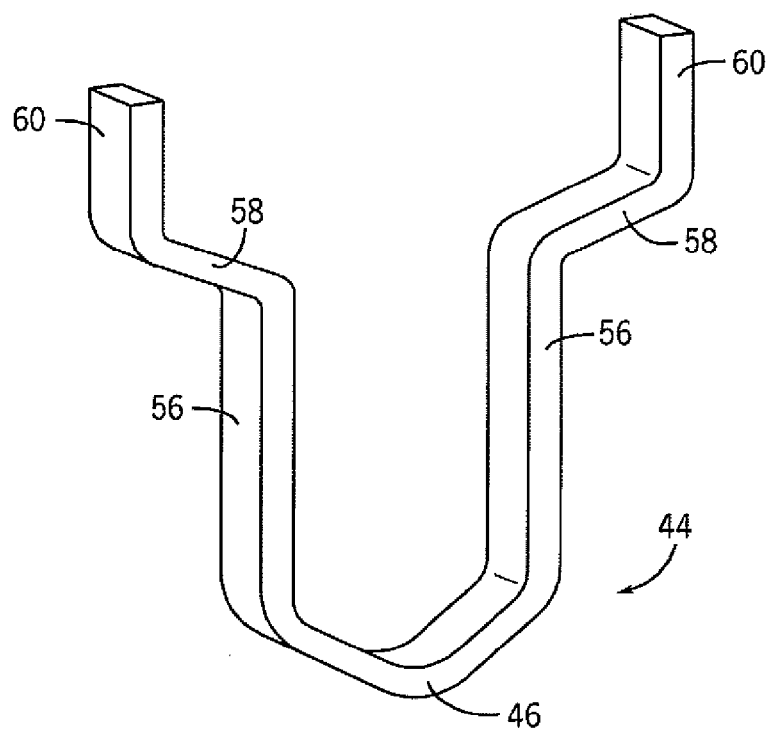
FIG. 5 is a perspective view of a conductor according to one embodiment of the invention.

In some embodiments, the stator winding 36 can comprise a plurality of conductors 44. In some embodiments, the conductors 44 can comprise a substantially segmented configuration (e.g., a hairpin configuration), as shown in FIGS. 3 and 5. For example, in some embodiments, at least a portion of the conductors 44 can include a turn portion 46 and at least two leg portions 48. In some embodiments, the turn portion 46 can be disposed between the two leg portions 48 to substantially connect the two leg portions 48. In some embodiments, the leg portions 48 can be substantially parallel. Moreover, in some embodiments, the turn portion 46 can comprise a substantially "u-shaped" configuration, although, in some embodiments, the turn portion 46 can comprise a v-shape, a wave shape, a curved shape, and other shapes. Additionally, in some embodiments, as shown in FIG. 5, at least a portion of the conductors 44 can comprise a substantially rectangular cross section. In some embodiments, at least a portion of the conductors 44 can comprise other cross-sectional shapes, such as substantially circular, square, hemispherical, regular or irregular polygonal, etc. In some embodiments, the conductors 44 can comprise other configurations (e.g., substantially non-segmented configuration).

In some embodiments, as shown in FIG. 3, at least a portion of the conductors 44 can be positioned substantially within the slots 42. For example, in some embodiments, the stator core 34 can be configured so that the plurality of slots 42 are substantially axially arranged. In some embodiments, the leg portions 48 can be inserted into the slots 42 so that at least some of the leg portions 48 can axially extend through the stator core 34. In some embodiments, the leg portions 48 can be inserted into neighboring slots 42. For example, in some embodiments, the leg portions 48 of a conductor 44 can be disposed in slots that are distanced approximately one magnetic-pole pitch apart (e.g., six slots, eight slots, etc.). In some embodiments, a plurality of conductors 44 can be disposed in the stator core 34 so that at least some of the turn portions 46 of the conductors 44 axially extend from the stator core 34 at a first axial end 50 of the stator core 34 and at least some of the leg portions 48 axially extend from the stator core 34 at a second axial end 52 of the stator core 34. In some embodiments, at least a portion of the conductor 44 regions that axially extend from the core 34 at the axial ends 50, 52 can comprise stator end turns 54.

In some embodiments, the conductors 44 can be generally fabricated from a substantially linear conductor 44 that can be configured and arranged to a shape substantially similar to the conductor in FIG. 5. For example, in some embodiments, a machine (not shown) can apply a force (e.g., bend, push, pull, other otherwise actuate) to at least a portion of a conductor 44 to substantially form the turn portion 46 and the leg portions 48 from a conductor 44.

In some embodiments, at least some of the leg portions 48 can comprise multiple regions. In some embodiments, the leg portions 48 can comprise in-slot portions 56, angled portions 58, and connection portions 60. In some embodiments, as previously mentioned, the leg portions 48 can be disposed in the slots 42 and can axially extend from the first end 50 to the second end 52. In some embodiments, after insertion, at least a portion of the leg portions 48 positioned within the slots 42 can comprise the in-slot portions 56. In some embodiments, in some or all of the slots 42, the leg portions 48 can be substantially radially aligned, as shown in FIG. 3. In some embodiments, in some or all of the slots 42, the leg portions 48 can comprise other configurations (e.g., a 2×2 configuration, as shown in FIG. 7).

In some embodiments, at least some of stator end turns 54 extending from stator core 34 at the second axial end 52 can comprise the angled portions 58 and the connection portions 60. In some embodiments, after inserting the conductors 44 into the stator core 34, the leg portions 48 extending from the stator core 34 at the second axial end 52 can undergo a twisting process (not shown) that can lead to the creation of the angled portions 58 and the connection portions 60. For example, in some embodiments, the twisting process can give rise to the angled portions 58 at a more axially inward position and the connection portions 60 at a more axially outward position, as shown in FIGS. 3 and 5. In some embodiments, after the twisting process, the connection portions 60 of at least a portion of the conductors 44 can be immediately adjacent to connection portions 60 of other conductors 44. As a result, the connection portions 60 can be coupled together to form one or more stator windings 36. In some embodiments, the connection portions 60 can be coupled via welding, brazing, soldering, melting, adhesives, or other coupling methods. Additionally, in some embodiments, the angled portions 58 and the connection portions 60 can extend from the first axial end 50 and can be configured and arranged in a similar manner as some previously mentioned embodiments.

In some embodiments, some components of the electric machine 20 such as, but not limited to, the rotor assembly 24, the stator assembly 26, and the stator end turns 54, can generate heat during operation of the electric machine 20. These components can be cooled to increase the performance and the lifespan of the electric machine 20.

In some embodiments, dissipation of heat energy at the stator end turns 54 can be insufficient to ensure efficient operations of the electric machine 20. For example, in some embodiments, heat energy can be produced by the stator end turns 54 as a result of current flowing through the end turns 54 during operation of the electric machine 20. Convection of the heat energy via air in the machine cavity 22 to the stator core 34 and/or the housing 12 can be insufficient because of the relatively poor thermal conductivity of air. As a result, in some embodiments, because of insufficient convection of heat energy to the housing 12 and/or the stator core 34, the stator end turns 54 can exhibit relatively large copper losses, which can result in inefficient operation of the electric machine 20.

Figure 6:
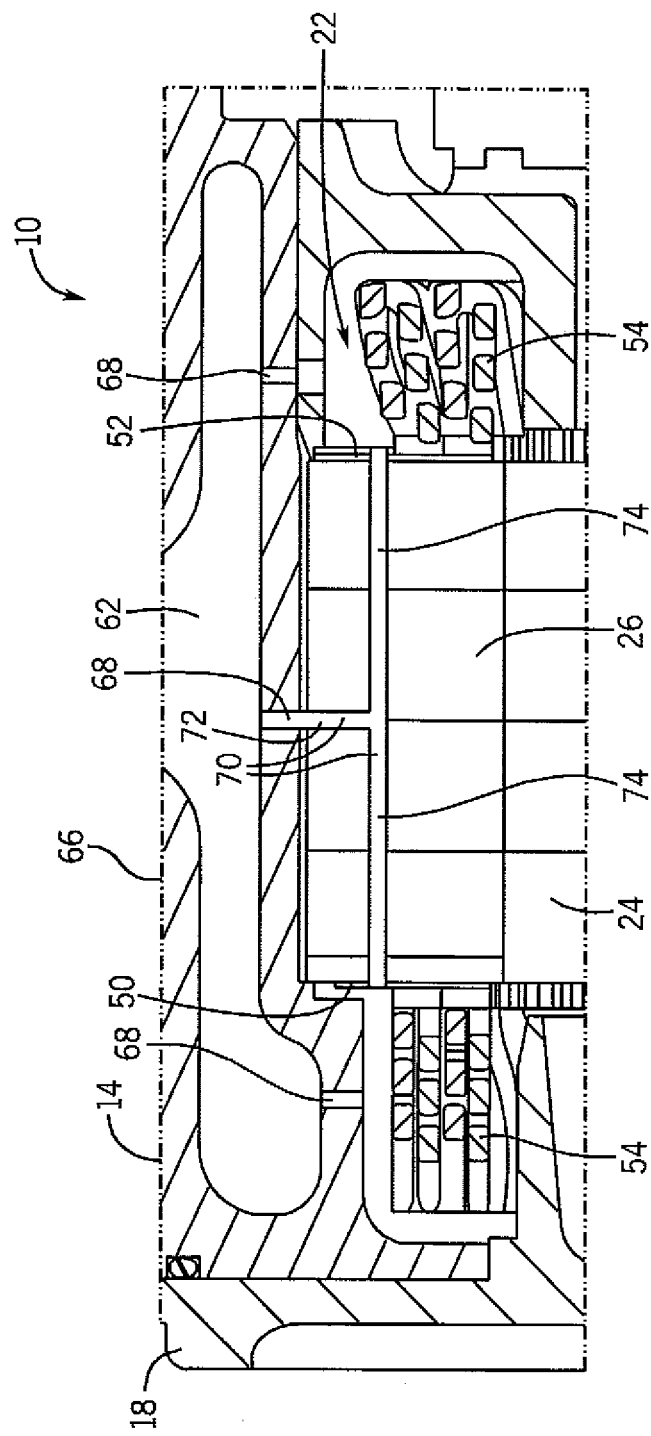
FIG. 6 is a partial cross-sectional view of portions of an electric machine module according to one embodiment of the invention.

As shown in FIGS. 1 and 6, in some embodiments, the housing 12 can comprise a coolant jacket 62. In some embodiments, the housing 12 can include an inner wall 64 and an outer wall 66 and the coolant jacket 62 can be positioned substantially between at least a portion of the walls 64, 66. For example, in some embodiments, the machine cavity 22 can be at least partially defined by the inner wall 64 (e.g., each of the elements of the housing 12 can comprise a portion of the inner wall 64). In some embodiments, the coolant jacket 62 can substantially circumscribe at least a portion of the electric machine 20. For example, in some embodiments, the coolant jacket 62 can substantially circumscribe at least a portion of the outer perimeter 43 of the stator assembly 26, including the stator end turns 54.

Further, in some embodiments, the coolant jacket 62 can contain a coolant that can comprise transmission fluid, ethylene glycol, an ethylene glycol/water mixture, water, oil, motor oil, a gas, a mist, or a similar substance. The coolant jacket 62 can be in fluid communication with a coolant source (not shown) which can pressurize the coolant prior to or as it is being dispersed into the coolant jacket 62, so that the pressurized coolant can circulate through the coolant jacket 62.

In some embodiments, at least a portion of the housing 12 can comprise at least one coolant aperture 68. In some embodiments, the housing 12 can comprise a plurality of coolant apertures 68. In some embodiments, at least a portion of the coolant apertures 68 can be disposed through a portion of the housing 12 to fluidly connect the coolant jacket 62 and the machine cavity 22 and portions of the electric machine 20. For example, in some embodiments, at least a portion of the coolant apertures 68 can be disposed through a portion of the inner wall 66 of the housing 12 to fluidly connect the coolant jacket 62 with the machine cavity 22. Moreover, in some embodiments, as previously mentioned, at least a portion of coolant circulating through the coolant jacket 62 can be pressurized so that as coolant circulates through the coolant jacket 62, at least a portion of the coolant can pass through the coolant apertures 68 can enter the machine cavity 22.

In some embodiments, the stator assembly 26 can comprise configurations to enhance coolant distribution and module 10 cooling. In some embodiments, the stator assembly 26 can be at least partially disposed within the machine cavity 22 so that at least a portion of the stator end turns 54 are substantially adjacent to at least a portion of the coolant apertures 68. For example, in some embodiments, at least a portion of the coolant apertures 68 can be substantially radially outward from at least a portion of the stator end turns 54. In some embodiments, the stator assembly 26 can comprise at least one coolant channel 70 that can be configured and arranged to guide at least a portion of the coolant for cooling of the stator assembly 26.

In some embodiments, the coolant channel 70 can comprise multiple configurations. In some embodiments, the coolant channel 70 can comprise a plurality of coolant channels 70 axially extending in a direction substantially parallel to at least a portion of the slots 42. For example, in some embodiments, at least a portion of the coolant channels 70 can extend from the first axial end 50 to the second axial end 52 and can be at least partially circumferentially arranged. By way of example only, in some embodiments, the stator assembly 26 can comprise a plurality of coolant channels 70 positioned around at least a portion of the circumference of the stator core 28 (e.g., some or all of the circumference). In some embodiments, at least a portion of the coolant channels 70 can be disposed through a portion of the stator core 28. For example, in some embodiments, the coolant channels 70 can be disposed through a portion of the stator core 28 that is radially outward from the slots 42 and the teeth 40, and as a result, the stator winding 36.

In some embodiments, at least a portion of the coolant channels 70 can comprise radial 72 and axial 74 subunits. For example, as shown in FIG. 6, in some embodiments, at least a portion of the axial subunits 74 can extend a generally axial length of the stator core 34 so that at least some of the coolant channels 70 are in fluid communication with the machine cavity 22 at the first and/or the second axial ends 50, 52 of the stator core 28. For example, in some embodiments, a fluid (e.g., air, coolant, a mist, etc.) can circulate from the first axial side 50 to the second axial side 52 via at least a portion of the coolant channels 70, or vice versa. By way of example only, in some embodiments, some or all of the axial subunits 74 of coolant channels 70 can axially extend through the stator core 34.

In some embodiments, at least a portion of the radial subunits 72 can at least partially extend through the stator core 34 in a generally radial direction. In some embodiments, the radial subunits 72 can extend from at least the outer perimeter 43 of the core 34 to the axial subunits 74 (e.g., at least a portion of the radial subunits 72 can comprise a length substantially similar to a distance from the axial subunits 74 to the outer perimeter 43). For example, in some embodiments, the stator assembly 26 can comprise substantially the same number of radial subunits 72 as axial subunits 74. In some embodiments, the radial subunits 72 can be oriented substantially perpendicular to the axial subunits 74 (e.g., the radial subunits 72 can be oriented substantially perpendicular to a horizontal axis of the axial subunits 74 and the slots 42). Moreover, in some embodiments, at least a portion of the radial subunits 72 can be circumferentially arranged with respect to the stator core 34. For example in some embodiments, the radial subunits 72 can be disposed through portions of the stator core 34 around at least a portion of the circumference of the stator core 34 (e.g., some or all of the circumference of the stator core 34). Furthermore, in some embodiments, at least a portion of the radial subunits 72 can be disposed through portions of the stator core 34 that are substantially axially centrally located (e.g., the radial subunits 72 can be disposed in a position that is substantially equidistant from the ends 50, 52). In some embodiments, the radial subunits 72 can be disposed in other locations and can be disposed in different locations relative to each other. For example, in some embodiments, some of the radial subunits 72 can be closer to one of the axial ends 50, 52 relative to some other radial subunits 72.

In some embodiments, the subunits 72, 74 can fluidly couple the coolant jacket 62 and the machine cavity 22. Referring to FIGS. 6 and 7A-7C, in some embodiments, the stator assembly 26 can be disposed within the housing 12 so that at least some of the radial subunits 72 substantially align with at least some of coolant apertures 68. For example, in some embodiments, at least a portion of the coolant apertures 68 disposed through the inner wall 64 can be substantially centrally disposed so that when the stator assembly 26 is positioned within the housing 12 (e.g., the sleeve member 14), at least a portion of the coolant apertures 68 can substantially align with at least a portion of the radial subunits 72. Moreover, in some embodiments, the housing 12 can comprise coolant apertures 68 substantially adjacent to the end turns 54 in addition to, or in lieu of coolant apertures 68 substantially aligned with the radial subunits 72. As a result, in some embodiments, at least a portion of the coolant circulating through the coolant jacket 62 can enter at least a portion of the coolant channels 70 via the coolant apertures 68. For example, in some embodiments, a portion of the coolant can exit the coolant jacket 62 via the coolant apertures 68 that are in fluid communication with the radial subunits 72 of the coolant channels 70. At least a portion of the coolant can flow from the radial subunits 72 into the axial subunits 74 of the coolant channels 70 and flow in both axial directions (e.g., flow toward both the first and the second axial ends 50, 52 of the stator core 34). Furthermore, in some embodiments, at least a portion of the coolant can exit the coolant channels 70 in a generally axial direction and enter the machine cavity 22. Additionally, in some embodiments, at least a portion of the coolant, after exiting the coolant channels 70, can flow toward a portion of the conductors 44 (e.g., the end turns 54).

In some embodiments coolant can flow through at least some of the coolant channels 70 to cool at least a portion of the stator end turns 54. In some embodiments, in addition to, or in lieu of, coolant contacting the end turns 54 from the coolant apertures 68 disposed radially outward from the end turns 54, coolant exiting the coolant channels 70 can contact the end turns 54, which can lead to improved cooling of the end turns 54 relative to some embodiments lacking the coolant channels 70. Moreover, in some embodiments, because the coolant channels 70 can be positioned around some or all of the circumference, coolant can reach a greater proportion of the end turns 54 relative to embodiments functioning without the channels 70. For example, in some modules 10 without some or all of the coolant channels 70, coolant can exit the coolant jacket 62 via coolant apertures 68 disposed through portions of the inner wall 68 in a substantially upper portion of the housing 12. In some embodiments, by including coolant channels 70 disposed around some or all of the circumference of the stator core 34, more coolant can reach the end turns 54, including end turns 54 at positions distal from the upper portion of the housing 12 (e.g., the stator end turns 54 adjacent to a bottom portion of the housing 12).

Further, in some embodiments, cooling can also be enhanced as coolant flows through the coolant channels 70. As coolant flows through both the radial and the axial subunits 72, 74, it can receive at least a portion of the heat energy produced by the stator winding 36. For example, as coolant flows axially outward it can receive at least a portion of the thermal energy produced by the conductors 44 because the coolant channels 70 can be substantially adjacent to the in-slot portions 56 and the slots 42. As a result, because of the relatively close proximity of at least a portion of the coolant channels 70 to some portions of the conductors 44, at least a portion of the heat energy produced during operation of the electric machine 20 can be transferred to coolant circulating through the coolant channels 70. Accordingly, in some embodiments, module 10 cooling can be enhanced by the inclusion of the coolant channels 70.

In some embodiments, the coolant channels 70 can comprise different configurations. In some embodiments, at least a portion of the coolant channels 70 can be formed after assembly of the laminations 38 to form the stator core 34. In some embodiments, at least a portion of the coolant channels 70 can be disposed through portions of the stator core 34 via machining, punching, or other conventional methods. By way of example only, in some embodiments, after assembly of the stator core 34, the axial subunits 74 can be formed in a generally axial direction substantially adjacent to at least a portion of the slots 42 and the radial subunits 72 can be formed in a generally radial direction so that at least a portion of the radial subunits 72 are in fluid communication with at least a portion of the axial subunits 74. As previously mentioned, in some embodiments, the coolant channels 70 can be disposed around some or all of the circumference of the stator core 34 so at least a portion of the coolant can flow adjacent to some portions of the stator winding 36 to aid in cooling.

In some embodiments, at least a portion of the coolant channels 70 can be formed prior to assembly of at least a some of the laminations 38. For example, in some embodiments, the laminations 38 can comprise apertures (not shown) so that, when at least a portion of the laminations are assembled, the apertures can substantially align to define portions of the coolant channels 70. In some embodiments, the laminations 38 can be formed (e.g., stamped, pressed, etc.) to include the apertures.

In some embodiments, one or more slot liners 76 can be disposed within at least a portion of the slots 42 to serve as insulation between the conductors 44 (e.g., the in-slot portions 56) and walls of the teeth 40 that define the slots 42, as shown in FIG. 7. As a result of disposing the slot liners 76 within the slots 42, the conductors 44 can be mechanically and electrically insulated from the stator core 34 to at least partially reduce short circuits and grounding events. Moreover, in some embodiments, the stator assembly 26 can comprise a varnish, which can provide physical and/or electrical insulation for the stator winding 36. For example, in some embodiments, the varnish (e.g., a resin, such as epoxy, or other insulating material) can be applied to the stator assembly 26 via vacuum pressure impregnation in a manner substantially similar to the process disclosed in U.S. patent application Ser. No. 13/233,187, which is owned by the assignee of the present application and is incorporated herein by reference in its entirety. Moreover, in some embodiments, the varnish can be applied to the stator assembly 26 in other manners, such as using other active and passive methods (e.g., gravity-based methods, submersion methods, etc.). In addition to insulating capabilities, in some embodiments, the varnish can also provide structural stability to the stator assembly 26 so that after coating at least some portions of the assembly 26 with the varnish, some portions of the stator assembly 26 (e.g., the slot liners 76) can possess greater structural strength relative to the pre-varnish stator assembly 26.

In some embodiments, at least a portion of the coolant channels 70 can be formed in other manners using at least a portion of the slot liners 76 or inserts disposed within the slots 42 (not shown). For example, in some embodiments, the inserts can comprise structures disposed at least partially within the slots 42 substantially adjacent to a radially outward portion of the slots 42 (e.g., a "roof" of the slot 42). For example, in some embodiments, the slot liners 76 or inserts can be disposed within the slots 42 so that they extend at least a portion of the axial length of the stator core 34. In some embodiments, a filler (not shown) can be disposed at least partially between the slot liners 76 or inserts and walls of the slots 42. By way of example only, in some embodiments, the filler can be disposed between the radially outward portion of the slots 42 (e.g., the roof of the slots 42) and the slot liners 76 and/or inserts.

In some embodiments, the filler can comprise a material that can be removable and/or dissolvable after varnishing. In some embodiments, the filler can be configured and arranged to be removed or dissolve after the stator core 34 is varnished. For example, in some embodiments, the filler can comprise a material such as nylon and/or Teflon® that can relatively easy to remove (e.g., a reduced friction coefficient) from between the slot liners 76 or inserts and the walls of the slots 42. Moreover, in some embodiments, the filler can comprise a material such as polystyrene (e.g., Styrofoam®) that can be dissolved using solvents such as acetone. In other embodiments, the filler can comprise any other materials that can be removed or dissolved after varnishing of the stator assembly 26. As a result of the removal and/or dissolution of the filler, in some embodiments, the axial subunits 74 of the coolant channels 70 can be defined by the space in which the filler was disposed prior to its removal and/or dissolution (e.g., at least a portion of coolant can flow through the spaces defined by the removal and/or dissolution of the filler). Moreover, in some embodiments, at least a portion of the conductors 44 can be disposed within the slots 42 before and/or after removal of the filler.

In addition, in some embodiments, the at least a portion of the conductors 44 can be disposed within the slots 42 after creation of at least a portion of the radial subunits 72 of the coolant channels 70. Moreover, in some embodiments, the radial subunits 72 can be formed prior to insertion of at least a portion of the conductors 44 within the slots 42 to minimize any risk of damaging the conductors 44 during the process of formation of the radial subunits 72. By way of example only, in some embodiments, the radial subunits 72 can be formed (e.g., machined, stamped, punched, etc.) around a portion of the stator core 34 and the filler can be disposed within at least a portion of the radial subunits 72 prior to varnishing the stator core 34. As a result, in some embodiments, after varnishing of the stator assembly 26, the filler can be removed and/or dissolved within the radial and axial subunits 72, 74 to form the coolant channels 70 for use in guiding coolant from the coolant jacket 62 to the machine cavity 22.

In some embodiments, the coolant channels 70 at least partially defined by the slot liners 76 or inserts can provide cooling benefits. For example, in some embodiments, the coolant channels 70 can be substantially sealed relative to portions of the slots 42 comprising the conductors 44 because of the varnishing process, however, the coolant channels 70 can still be disposed substantially adjacent to the conductors 44 and in thermal communication for transfer of heat energy. Although, in some embodiments, at least a portion of the axial subunits 74 can be in fluid communication with some portions of the slots 42 in which the conductors 44 are disposed so that at least a portion of the coolant can contact some portions of the conductors 44. As a result, in some embodiments, coolant can flow substantially adjacent to at least a portion of the conductors 44 as it flows through the coolant channels 70 to receive thermal energy produced by the conductors 44 during operation of the electric machine 20, which can lead to enhanced cooling of the module 10.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein. Various features and advantages of the invention are set forth in the following claims.

The invention claimed is:

1. An electric machine module comprising:
a housing at least partially defining a machine cavity;
a stator assembly including a stator core and stator end turns, the stator assembly being at least partially disposed within the housing;
a coolant jacket being at least partially positioned within the housing;
a plurality of coolant apertures being disposed through a portion of the housing so that
the coolant jacket is configured for a shared fluid communication path with the machine cavity and the stator assembly; and
the stator assembly including a plurality of coolant channels being in fluid communication with the machine cavity, each of the plurality of coolant channels comprising at least one substantially radial subunit and at least one substantially axial subunit; and
wherein at least some of the radial subunits are fluidly coupled to at least a portion of the plurality of coolant apertures so that at least a portion of the coolant channels are configured to be in a shared fluid communication path with the coolant jacket and the machine cavity;
wherein the at least one substantially axial subunit extends through the stator core exiting proximate at least one stator end turn, the at least one substantially axial subunit configured to enable liquid coolant to exit the coolant channels adjacent at least one of the end turns by flowing in a generally axial direction toward a portion of at least one of the end turns and into the machine cavity.

2. The electric machine module of claim 1, wherein the stator assembly comprises a plurality of slots and a stator winding disposed in the plurality of slots.

3. The electric machine module of claim 2, wherein the plurality of coolant channels are disposed radially outward from at least a portion of the plurality of slots.

4. The electric machine module of claim 2, wherein at least some of the plurality of coolant channels are disposed within at least some of the plurality of slots.

5. The electric machine module of claim 2, wherein the stator assembly comprises substantially the same number of coolant channels as slots.

6. The electric machine module of claim 1, and wherein at least some of the plurality of coolant channels are configured and arranged to guide liquid coolant from the coolant jacket toward the stator end turns.

7. The electric machine module of claim 1, wherein the housing comprises a number of coolant apertures that is at least as great as a number of coolant channels.

8. The electric machine module of claim 1, wherein at least a portion of the axial subunits extend an axial distance substantially similar to an axial length of the stator assembly.

9. An electric machine module comprising:
a housing at least partially defining a machine cavity;
a stator assembly including a stator core a plurality of slots, an outer diameter, a first axial end, a second axial end, and stator end turns,
the stator assembly being at least partially disposed within the housing;
a coolant jacket being at least partially positioned within the housing and circumscribing at least a portion of the stator assembly;
a plurality of coolant apertures being disposed through a portion of the housing so that the coolant jacket is configured for a shared fluid communication path with the machine cavity and the stator assembly; and
a plurality of coolant channels being disposed through a portion of the stator assembly, each of the plurality of coolant channels including an axial subunit extending substantially from the first axial end of the stator assembly to the second axial end of the stator assembly and a radial subunit extending from the outer diameter to the axial subunit; and
wherein the radial subunits are configured to be in a shared fluid communication path with the coolant jacket and the machine cavity via at least some of the plurality of coolant apertures; and
wherein the axial subunit exits proximate the stator end turns, the axial subunit configured to enable liquid coolant to exit the coolant channels adjacent the end turns by flowing in a generally axial direction toward the end turns and into the machine cavity.

10. The electric machine module of claim 9, wherein the axial subunits are in fluid communication with the machine cavity at the first axial end and the second axial end of the stator assembly.

11. The electric machine module of claim 9, wherein the stator assembly comprises a substantially similar number of coolant channels and slots.

12. The electric machine module of claim 9, wherein at least a portion of the axial subunits are disposed within some of the plurality of slots.

13. The electric machine module of claim 9, wherein at least a portion of the axial subunits are disposed immediately radially outward from some of the plurality of slots.

14. The electric machine module of claim 9 and further comprising at least one slot liner disposed in at least some of the plurality of slots.

15. The electric machine module of claim 14, wherein the at least one slot liner disposed in at least one of the plurality of slots defines at least a portion of at least one of the plurality of coolant channels.

* * * * *